Figure 2:
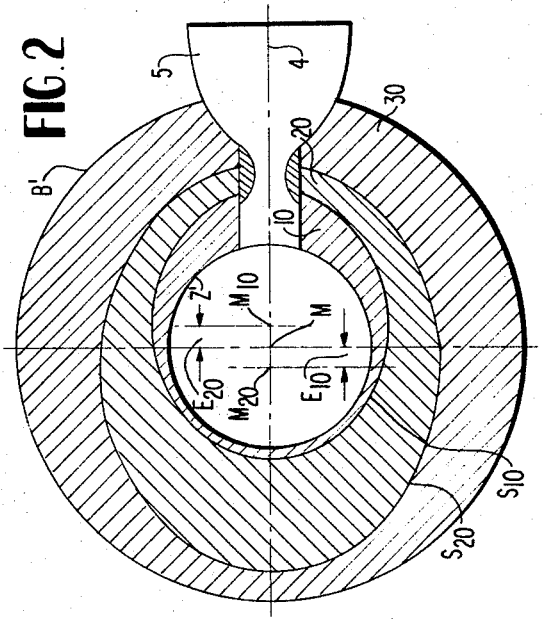

United States Patent

[11] 3,585,799

| [72] | Inventor | Paul Geschwentner<br>Rohrmoos, Germany |
|---|---|---|
| [21] | Appl. No. | 849,681 |
| [22] | Filed | Aug. 13, 1969 |
| [45] | Patented | June 22, 1971 |
| [73] | Assignee | Motoren-Und Turbinen-Union Munchen<br>G.m.b.H.<br>Munich, Germany |
| [32] | Priority | Aug. 14, 1968 |
| [33] | | Germany |
| [31] | | P 17 51 889.7 |

[54] ROCKET MOTOR PROPELLANT
9 Claims, 4 Drawing Figs.

[52] U.S. Cl...................................................... 60/250,
60/39.47, 60/253, 102/101
[51] Int. Cl....................................................... F02k 9/04,
F02k 9/06

[50] Field of Search............................................ 60/250,
253, 39.47; 102/101

[56] References Cited
UNITED STATES PATENTS

| 3,052,092 | 9/1962 | Kirkbride..................... | 60/250 |
| 3,120,737 | 2/1964 | Holloway..................... | 60/250 |
| 3,121,309 | 2/1964 | O'Donnell.................... | 60/253 |
| 3,280,566 | 10/1966 | La Rue........................ | 60/253 |

*Primary Examiner*—Douglas Hart
*Attorney*—Craig, Antonelli, Stewart & Hill

ABSTRACT: A solid-fuel rocket in which at least three propellants with different combustion rates and of either spherical or ellipsoidal shape are used, which are arranged either concentrically or eccentrically to a center point of the rocket.

INVENTOR
PAUL GESCHWENTNER

BY Craig, Antonelli, Stewart & Hill
ATTORNEYS

ROCKET MOTOR PROPELLANT

The present invention relates to a solid-fuel rocket, the propellant of which is arranged in a metal or plastic container that has the shape of a sphere or approximately of an ellipsoid whereby the internal ignition surface is arranged either concentrically or eccentrically to the outer limiting surface and is connected to the outside by way of the nozzle.

Rockets have already been proposed heretofore which feature two propellants with different combustion rates. However, in these known rockets the ignition surface as well as mainly these propellants adjacent to the ignition surfaces, take the form of multicornered or polygonal bodies, which are difficult to manufacture by reason of the complicated shape thereof.

As an example, in one such known rocket there was proposed an ignition surface consisting of three or more curved-shaped branches arranged in rotational symmetry to the longitudinal centerline or axis of the rocket. The dividing or separating surface between the first propellant and the second, outer propellant, which is associated with the first propellant disposed adjacent to ignition surface, is in this case essentially a triangle, axially symmetrical to the longitudinal axis of the rocket, whose pointed vertices extend to the outer limiting surface of the rocket. The sidewalls of this triangular-shaped dividing or separating surface of the first propellant are in this case tangential to the curved branches of the ignition surface.

The pointed vertices of this triangular-shaped dividing surface of the first propellant entail, in addition to the complicated and thus costly manufacture of the propellants, the further disadvantage that during the combustion of the propellants, local peak stresses may build up which lead to cracks in the propellant structure and thus to an early failure of the rocket propulsion. Therebeyond, such dividing surfaces between propellants having pointed corners are very sensitive to the shocks and vibrations occurring during the operation of the rocket.

In addition thereto, there exists as a further disadvantage the already-mentioned triangular geometry with pointed corners of the dividing surface between the first propellant and the second propellant which, in conjunction with the unfavorable geometry of the ignition surface, leads to an erosive combustion.

In another prior art rocket, two propellants with different combustion rates are arranged in a common spherical container. The dividing surface associated with the first propellant has, in this case, approximately the shape of a hyperboloid, concentric to the longitudinal axis of the rocket, with a considerable constriction or reduction in area at the place which coincides approximately with the center of the spherical container. The remaining space between the outer container wall and the dividing surface of the first propellant serves almost entirely for the accommodation of the second propellant. In this known rocket the ignition surface is located on the side adjacent the propelling or thrust nozzle, and more particularly on the one concave surface of the first propellant. Between the ignition surface and the part of the outer container wall provided with the thrust nozzle, there remains a space free of any propellants. In this case, during rocket operation, the container wall opposite the ignition surface is directly subjected to the combustion gas from the ignition surface, so that a premature burning-through of this part of the container wall is to be expected; thus, on the basis of this proposed, prior art arrangement the rocket can be rendered operatively safe and reliable only if the container wall opposite the ignition surface is lined with special heat-resistant insulating materials which, however, would be connected again with a weight increase of the rocket neither desirable in practice or compatible with the requirements of practical operation.

As a result of the arbitrary and unorthodox design and arrangement of the propellants inclusive the ignition surface proposed in this prior art rocket, this rocket is therefore also unable to or is able to meet only extremely incompletely and most unsatisfactorily, the demands to achieve an efficient and favorable combustion of all propellants, which proceeds in such a manner that the combustion front reaches the outer boundary surface simultaneously at all points, thus preventing local overheating of the wall portions of the rocket by the combustion gas.

The present invention aims at overcoming the disadvantages encountered with the aforementioned prior art and at creating a rocket, whose propellants are easy to manufacture by reason of an uncomplicated shape thereof whereby furthermore, by the choice of the shape of the propellants as well as by the arrangement of the propellants relative to the ignition surface a steady, even combustion of the propellant is attainable which proceeds in such a manner that the combustion front reaches the outer limiting surface of the rocket simultaneously at all points, whereby a one-sided combustion gas load and thus local over heating of the wall parts of the rocket are to be avoided so that, unlike with the known rockets, the use of special heat-resistant insulating materials can be confined to a minimum.

As solution to the underlying problems, the present invention proposes that in a rocket of the type described above, the entire solid fuel consists of at least three propellants of spherical or ellipsoidal shape with respect to the axis of rotation which have different combustion rates and are arranged concentric or eccentric to a center point.

According to a further development of the invention, the centers of the dividing surfaces associated with the propellants may be arranged eccentric to the center of the spherical ignition surface or the outer boundary surface.

A further suitable construction of the present invention resides in that an equal or unequal eccentricity of the centers of the dividing surfaces relative to the centers of the ignition surface or of the outer boundary surface is provided.

According to a further feature of the present invention the centers can be arranged on a straight line, which is the longitudinal centerline or axis of the rocket.

In a rocket according to the present invention the ignition surface and the outer limiting surface can also be of spherical shape and be coordinated to a common center, while the dividing surfaces of the propellants exhibit an elliptical cross section and are arranged equal eccentric to the center of the ignition surface and the outer limiting or boundary surface.

An appropriate construction of a rocket according to the present invention also results, if the ignition surface, the dividing surfaces and the outer limiting surface have a common center, whereby the dividing surfaces have an elliptical cross section while, on the other hand, the ignition surface and the outer limiting surface are of spherical cross section.

Finally the present invention proposes that all the dividing surfaces associated with the propellants, including the ignition surface and the outer limiting surface be ellipsoidal and coordinated to a common center.

Figure 1:
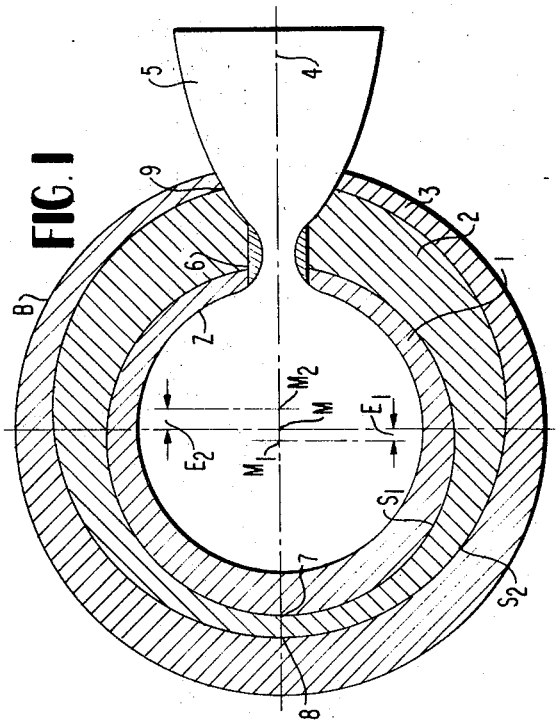
Figure 4:
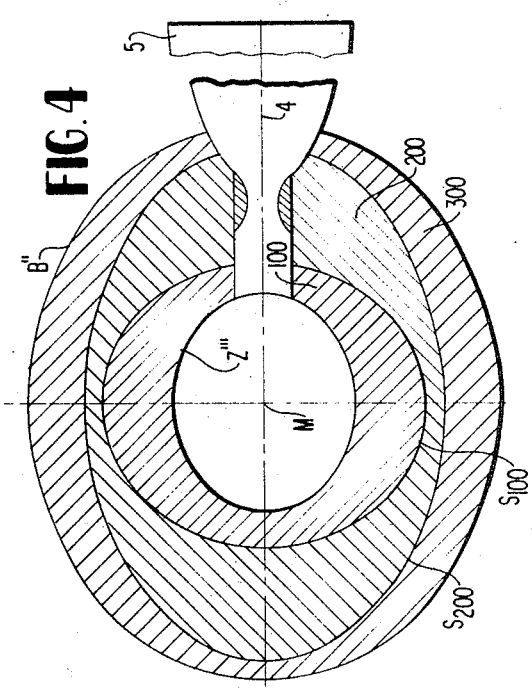
Figure 3:
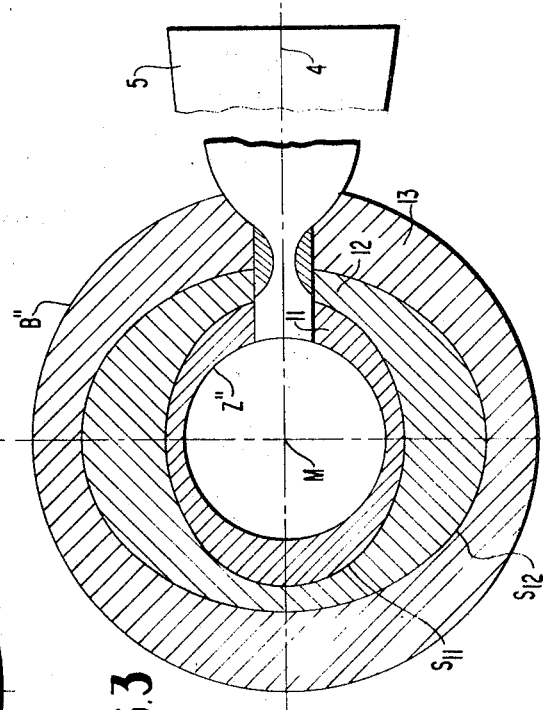

These and other objects, features and advantages of the present invention will become more apparent from the following description when taken in connecting with the accompanying drawing which shows in side view cross sections, for purposes of illustration only, several embodiments in accordance with the present invention and wherein:

FIG. 1 is a side view cross section, taken through the longitudinal center axis, of a first embodiment of a rocket according to the present invention, FIG. 2 is a side view cross section, similar to FIG. 1, of a second embodiment of a rocket according to the present invention, FIG. 3 is a side view cross section, similar to FIGS. 1 and 2, of a third embodiment of a rocket according to the present invention, and FIG. 4 is a side view cross section, similar to FIGS. 1—3 of a fourth embodiment of a rocket according to the present invention.

Referring now to the drawing wherein like reference numerals are used throughout the various views thereof to designate like parts, the rocket shown in FIG. 1 essentially consists of the propellants 1, 2, 3, of an ignition surface Z and an outer limiting or boundary surface B of the propellants. In this case, the ignition surface Z and the propellants 1, 2, 3 are spherically shaped as also the outer boundary surface B. The ignition surface Z and the outer boundary surface B are coordinated to a common center M, which lies on the longitudinal axis or centerline 4 of the rocket. The centers $M_1$, $M_2$ of dividing surfaces $S_1$ and $S_2$ associated with propellants 1, 2 are likewise disposed on the longitudinal axis or centerline 4 of the rocket whereby the center $M_1$ with dividing surface $S_1$ associated with propellant 1 is eccentrically space from the center M of the ignition surface Z with an eccentricity $E_1$, while the center $M_2$ of dividing surface $S_2$ associated with propellant 2 is space from center M of ignition surface Z with an eccentricity $E_2$. It should be noted that, in this case, the eccentricities $E_1$ and $E_2$ are unequal, i.e., eccentricity $E_1$ is smaller than eccentricity $E_2$.

In the embodiment, shown in FIG. 1, the spherical ignition face Z is directly connected to propelling or thrust nozzle 5. This thrust nozzle is of any conventional construction converging from the connection with the ignition surface towards the throat cross section and thereafter again diverging.

In the following the advantage of a rocket according to this invention as well as the sequence of its operation are briefly outlined.

The spherical ignition surface Z, as shown in FIG. 1, ensures a uniform ignition at all points. The combustion front then advances and expands according to the combustion rate of the propellant 1 and the combustion increases according to the square of the radius of the combustion front until the latter has reached point 6. From there, combustion of propellant 2 starts, which has a lower combustion rate than propellant 1. The combustion front advances further whereby at the same time, the share or proportion of the slower burning propellant 2 becomes ever greater and thus the thrust decreases again until it reaches a minimum when the combustion front arrives at point 7. From there only propellant 2 participates in the combustion so that the thrust again increases as a square power until the combustion front reaches the dividing surface $S_2$ at point 8. Finally, the propellant 3 burns at a still slower rate yet than the propellant 2, whence a decrease in the thrust occurs until the combustion front reaches the point 9. From here the thrust again increases until it reaches the selected design value at the outer boundary surface B.

By means of the arrangement proposed in this embodiment for centers $M_1$ and $M_2$ of dividing surfaces $S_1$ and $S_2$ as well as by the proposed eccentricities $E_1$ and $E_2$ and the differential combustion rates of the propellants 1, 2 and 3 a uniform advancing control of the combustion front is achieved, which, after combustion of the propellants, should reach the outer boundary surface B simultaneously at all points.

FIG. 2 shows a further embodiment of a rocket according to the present invention, which is suitable to fulfill these aforementioned requirements made of the present invention. This rocket differs from the rocket according to FIG. 1 in that dividing surfaces $S_{10}$, $S_{20}$ of propellants 10, 20 are rotation-ellipsoids arranged coaxially to the longitudinal axis 4 of the rocket, and in that the ignition surface Z' as well as the outer boundary surface B' are spherical and coordinated to a common center M. The dividing surfaces $S_{10}$, $S_{20}$ associated with the propellants 10, 20 are coordinated to centers $M_{10}$, $M_{20}$ which are also disposed on the rocket longitudinal axis 4 and are offset relative to center M by eccentricities $E_{10}$, $E_{20}$. The sequence of operation and the process of the combustion of the igniter propellant Z' as well as of the propellants 10, 20 and 30 are essentially the same as those of the rocket according to FIG. 1; also in this case it is very important that the combustion rate of the propellants decreases from the inside towards the outside in order to achieve that the combustion front will reach the outer boundary surface B' as simultaneously as possible as is desired.

In the rocket according to FIG. 3 the outer boundary surface B'' as well as the ignition surface Z'' are spherically shaped and are coordinated to a common center M, that is again disposed on the rocket longitudinal axis 4. The rotation-ellipsoidal dividing surfaces $S_{11}$, $S_{12}$ of the propellants 11, 12 are likewise coordinated to this center M.

In the embodiment of a rocket according to the present invention as shown in FIG. 4, the dividing surfaces $S_{100}$, $S_{200}$ of the propellants 100, 200, as well as the outer boundary surface B''' and the ignition surface Z''' are rotation-ellipsoidal and are coordinated to a common center M which is located on the rocket longitudinal axis 4. Also with this rocket according to FIG. 4, it is possible to achieved by appropriate choice of the combustion rates of the ignition surface and of the individual propellants as well as by the advantageous configuration of the dividing surfaces that as uniform as possible a thrust level is realized and the combustion front will, after combustion of the propellants, reach the outer boundary surface B''' as simultaneously as possible in all points, as aimed at.

The embodiments of the rockets, as shown in FIGS. 1 through 4, represent on the basis of the geometrically favorable spherical or elliptical shapes of the propellants, examples for propellants which can be manufactured in a simple manner, i.e., without undue engineering expenditures and which will assure therebeyond that no local erosive combustion occurs at certain spots of the propellants. In addition, the propellant configurations according to the present invention, as shown in FIGS. 1 through 4, are very insensitive to shocks and vibrations as are encountered during rocket operation.

While I have shown and described several embodiments in accordance with the present invention, it is obvious that the same is not limited thereto but is susceptible of numerous changes and modifications as known to persons skilled in the art, and I therefore do not wish to be limited to the details shown and described herein but intend to cover all such changes and modifications as are within the scope of those skilled in the art.

I claim:

1. A solid propellant rocket motor, the propellant of which is arranged in a metal or plastic container of at least axially symmetrical shape and has an inner ignition surface and an outer boundary surface, both surfaces being substantially spherical, the propellant consists of at least three propellant charges arranged in predetermined relationship to a center point for one of said two surfaces which have different combustion rates and are of axially symmetrical configuration, characterized in that the ignition surface is arranged eccentrically to the outer boundary surface.

2. A solid propellant rocket motor according to claim 1, characterized in that the centers of dividing surfaces associated with two propellants are arranged eccentric to the center of a spherical surface consisting of one of said ignition surface and of said outer boundary surface.

3. A solid propellant rocket motor according to claim 2, characterized by an identical eccentricity of the centers of said dividing surfaces relative to the center of said spherical surface.

4. A solid propellant rocket motor according to claim 3, characterized in that centers lie on a straight line, which is the longitudinal centerline of the rocket.

5. A solid propellant rocket motor according to claim 2, characterized by an unequal eccentricity of the centers of said dividing surfaces relative to the center of said spherical surface.

6. A solid propellant rocket motor according to claim 5, characterized in that centers lie on a straight line, which is the longitudinal centerline of the rocket.

7. A solid propellant rocket motor according to claim 1, characterized in that the ignition surface and the outer boundary surface are substantially spherical and coordinated to a substantially common center while the dividing surfaces of propellants exhibit an approximately elliptical cross section and are arranged eccentric to the center of the ignition surface and of the outer boundary surface.

8. A solid propellant rocket motor according to claim 1, characterized in that the ignition surface, dividing surfaces of the propellants and the outer boundary surface have a substantially common center, the dividing surfaces having an approximately elliptical cross section whereas the ignition surface and the outer boundary surface have substantially spherical cross section.

9. A solid-fuel rocket according to claim 1, characterized in that all the dividing surfaces associated with propellants including the ignition surface as well as the outer boundary surface are approximately axially symmetrically ellipsoidal and coordinated to a substantially common center.